Patented July 3, 1928.

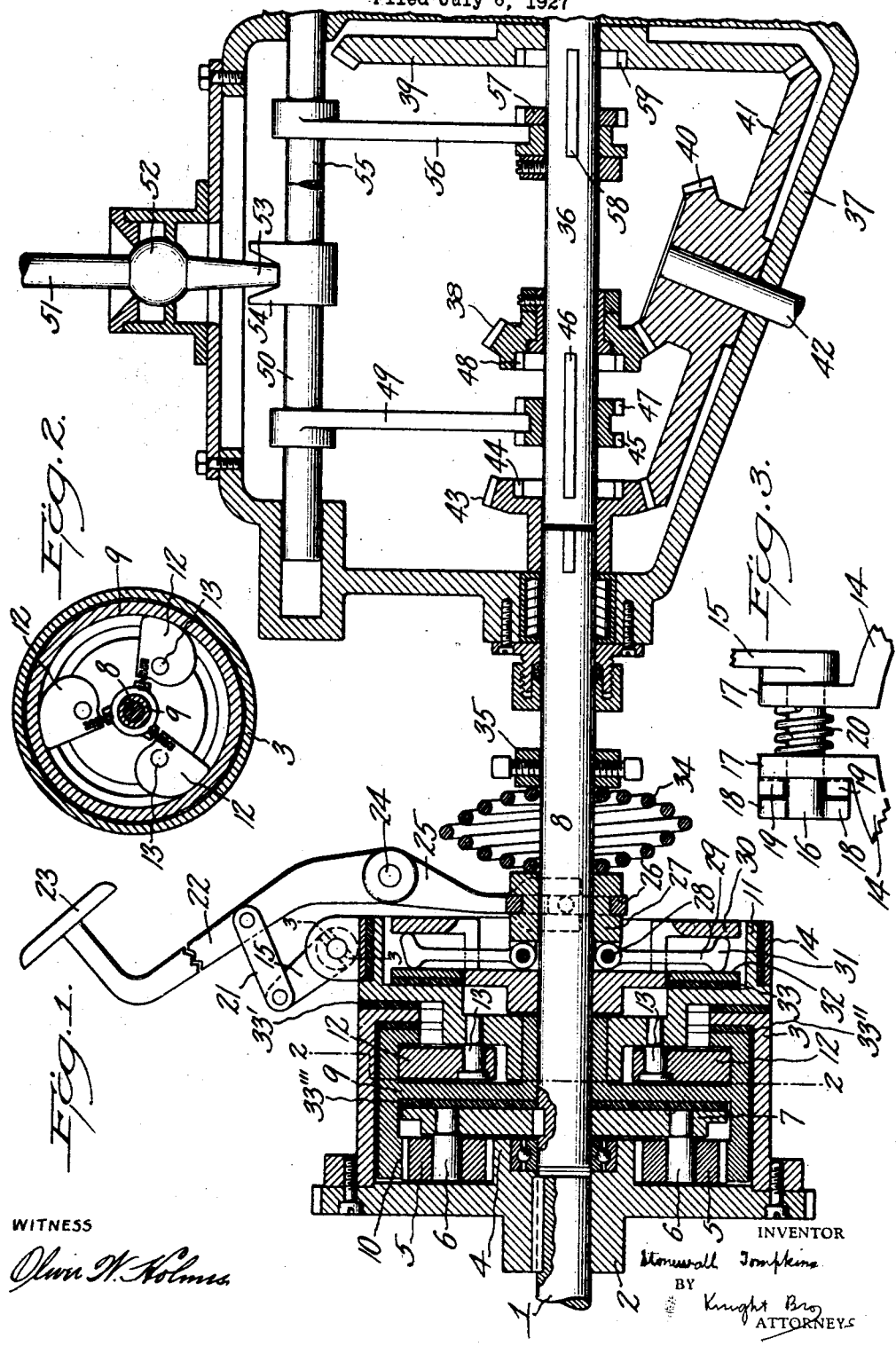

1,675,392

UNITED STATES PATENT OFFICE.

STONEWALL TOMPKINS, OF PASSAIC, NEW JERSEY.

TRANSMISSION GEARING.

Application filed July 6, 1927. Serial No. 203,775.

This invention relates to transmission gearing in which gear shift devices are combined with a planetary transmission with the object of obtaining the advantages of both methods.

A primary purpose of the invention is to so control the two kinds of transmission that they may be operated by the same control means and in the same manner of control as is now the general practice in automobiles; namely, with a gear shift lever for neutral, low, high and reverse and a foot pedal for holding open a clutch against the closing effort of a spring.

Another object of the invention is to introduce in the midmotion of the foot lever a coupling of the planetary gears in a combination that will give low gear before the full speed is effected by the complete release of the foot lever. A further purpose of the invention is to combine with the above described functions a gear shift mechanism of the ordinary type, but with only two forward speed ratios and one reverse whereby the operator may have available four forward speeds and two reverses. A further object of the invention is to provide a pawl device between the low speed clutch and the high speed clutch whereby the former will not in any event interfere or restrain the latter.

Other objects will appear from the following description of an embodiment of my invention.

In the accompanying drawings

Figure 1 represents an embodiment of my invention in longitudinal axial section.

Figure 2 is a transverse section on line 2—2 of Figure 1, and

Figure 3 is a section through the brake clamping device on line 3—3 of Figure 1.

At 1 is shown an engine shaft or driving member which may be the engine shaft of an automobile engine. Keyed to this shaft is a fly wheel 2 carrying a clutch casing 3 inside of which are arranged the planetary transmission gears and the clutch members. The fly wheel has a pinion member 4 with which engage the planetary pinions 5, which in turn are carried on studs 6 mounted in a planetary gear carrier 7. This gear carrier is keyed to a second shaft 8 in axial alinement with the engine shaft. Revolving freely upon the second shaft 8 is a floating gear 9 having at 10 internal gear teeth meshing with the planetary pinions 5. A second floating member 11 is mounted to turn freely on the hub of the floating gear 10. Between these two floating members friction pawls 12 (see Figure 2) are mounted pivotally on the member 11 on studs 13 and inclined in such a way as to allow rotative movement between the two floating members in one direction while preventing it in another. The member 11 is used to arrest the motion of the floating gear 9 in one direction by having clamped upon it a friction band brake 14 (see Figure 3). In this brake setting device a third lever 15 has a shaft extension 16 which passes through holes in the ears 17 of the brake band 14, and on the end of the shaft furthest from the lever, cam arms 18 extend radially, which cam arms at a certain intermediate position of the lever 15 are adapted to ride up over cam bosses 19 on one of the ears 17, the result of which is to draw the ears 17 together against the force of an intermediate spring 20 and clamp the brakes. Any movement of the lever in either direction will release the brake. The lever 15 is connected by a rod 21 to a foot lever 22 having a pedal 23. This lever is pivoted to the frame of the engine at 24 and has an arm 25 which is forked at its lower end to straddle and engage a thrust ring 26 within which a revolving hub 27 turns. The hub 27 has pivoted at 28 clutch binding levers 29. A member 30 secured to the second shaft 8 serves as an abutment for the clutch binding members 29, the ends of said members having inclined extensions 31 that, in the position shown in Figure 1, impinge against a ring 32 between which and the floating member 11 is a friction disc 33. Other friction discs 33', 33", and 33''', are located respectively between the member 11 and casing 3, between the casing 3 and floating gear 9, and between floating gear 9 and the planetary gear carrier 7. All these parts are firmly clamped when the clutch binding members 29 are set up in the clutch closing position as shown in Figure 1. They are forced into this position by a clutch spring 34 having an abutment 35 secured to the second shaft and pressing against the thrust collar 27 to which the clutch members 29 are articulated. When the clutch members are so set into their holding position all the parts shown to the left of the spring are revolving together as is usual in automobile transmissions. When so operating, the cam members 18 and 19 are not in contact. At 36 is shown a third or driven shaft journalled in a gear case 37 and having mounted loosely upon it two bevel wheels 38 and 39 meshing respectively with gears 40 and 41 carried by a stud shaft 42 on the casing 37. The stud shaft 42 is inclined at such an angle to the shaft 36 as will give the proper ratio of speeds between the various gears. Another bevel wheel 43 is secured to the second shaft 8 and has interior clutch teeth 44 adapted to engage with a gear clutch 45 shiftable axially on the shaft 36 and rotated with the said shaft by spline 46. The gear clutch also has teeth 47 adapted to engage interior teeth 48 in the bevel wheel 38. The gear clutch 45, 47 is movable along the shaft 8 by means of a forked shifting member 49 carried by shifting rod 50 and operatable by a gear shifting lever 51 pivoted at 52 and engaging by its lower end 53 in a slotted projection 54 secured to the shifting rod 50. In like manner another shifting rod 55 may be engaged by the same lever end 53 by a lateral motion of the lever 51, the bearing 52 being made in the nature of a gimbal or ball bearing for this purpose. The shifting rod 55 carries a shifting fork 56 which engages with a clutch gear 57 movable on spline 58 on the shaft 8 and adapted to engage internal teeth 59 in the gear 39 to lock the shaft 8 to the gear 39 to make them turn together. The transmission gear is operated as follows:

With the parts in the position shown in Figure 1, the engine shaft may be running, but with the gear shift lever 51 in the neutral position as shown, the third or driven shaft 36 will be disconnected from the moving parts. The spring will hold the clutch members fast together, the second shaft will be turning with the first shaft, and gears 43, 40, and 41 and 38 will all be running idle. To start up in the lowest speed, the operator will depress the foot pedal as far as possible pressing the spring 34 and holding it compressed while the shift lever 51 is moved in engagement with part 54 by a lateral motion, and then by a longitudinal motion, throwing gear 47 into engagement with gear 48. Then lifting his foot slightly, the cams 18 and 19 will ride upon each other and set the brake 14, thus holding stationary the floating member 11 and through the pawls 12 holding stationary also the floating gear 9 which will then act as an abutment gear upon which the planetary pinions 5 will roll and thereby propel the member 7 at a speed approximately one third that of the driving shaft. The second shaft being driven at this reduced speed passes the motion on through its end pinion 43 to gear 41 which thus turns at a slower speed and this slower speed is communicated by gears 40 and 38 to the driven shaft giving a reduction of say 9 to 1 from the first to third shaft. Leaving the gear shaft lever 51 in this position, the foot pedal may be released still farther until the cams 18, 19 become disengaged thus releasing the brake 14. Further release of the clutch pedal will allow the spring 34 to press all the members of the clutch assemblage together thru the action of the clutching members 29, whereupon the floating gear 9 will tend to turn with the fly wheel instead of being pushed in the opposite direction. It will be free to turn in this direction even if the brake 14 has not entirely released the member 11 on account of the pawl members 12. This will give an intermediate speed with both the hand lever and the foot lever in position of repose. To work on still higher ranges of speed, the foot lever is again depressed to its full amount, thus releasing the clutch, and the shifting lever then moves to engage the gear 45 with gear 44 when the foot pedal may be again manipulated as before to give two speeds of higher range than the two lower speeds just described. In this case, the gear 43 is driving the third shaft direct. To obtain a reverse motion, gear shift lever 51 is made to engage with shifting rod 55 and then gear 57 is forced into engagement with gear 59, whereupon the gear 39 becomes locked to the driven shaft and the power is transmitted through the gears 41 and 39 to give a reverse motion to the driven shaft at a lower rate of speed.

The sliding gear transmission shown and described is not claimed herein as it forms the subject matter of a separate application now pending in the Patent Office.

I claim:

1. In transmission gearing, a driving shaft and a second shaft, planetary gearing connecting the driving and second shafts, a floating gear meshing with the planetary gears, a brake adapted to hold the floating gear stationary to cause the planetary gears to drive the second shaft at slower speed than the driving shaft, clutch members adapted to clamp the driving shaft to the second shaft for high speed, a spring adapted to hold the clutch members so clamped, a foot lever adapted to hold the spring retracted and the clutch members unclamped, and means operatable by the said lever for setting the brake on the floating gear during a first part of the movement of the lever and releasing the said brake during a second part of its movement.

2. A construction according to claim 1 in which means are interposed between the floating gear and its brake whereby the brake is effective in one direction only.

3. A construction according to claim 1 in which a second floating member is interposed between the floating gear and the brake with slip pawls between the floating members to permit relative motion between the said members in one direction only.

4. A construction according to claim 1 in which there is an abutment member on the second shaft with friction members interposed between the floating members, the fly wheel, and the abutment member on the second shaft.

STONEWALL TOMPKINS.